Patented Dec. 14, 1937

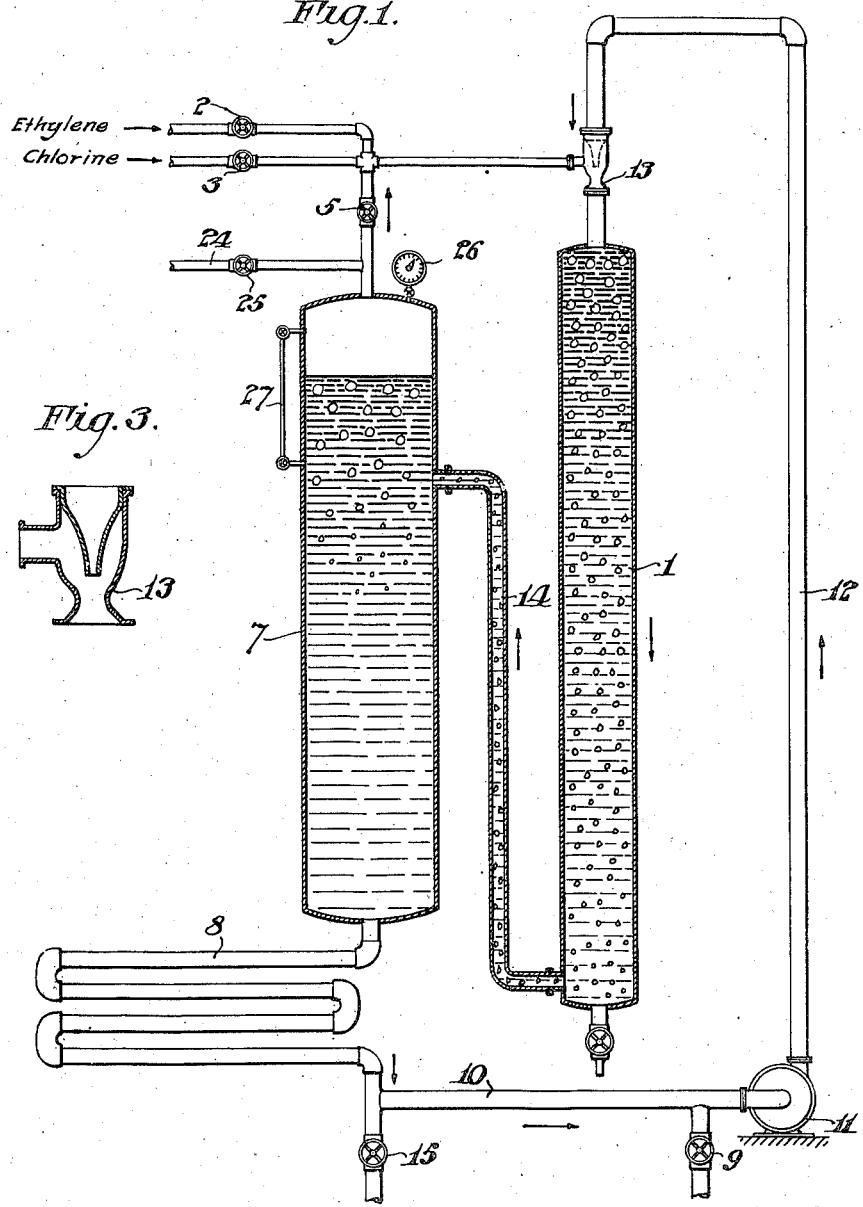

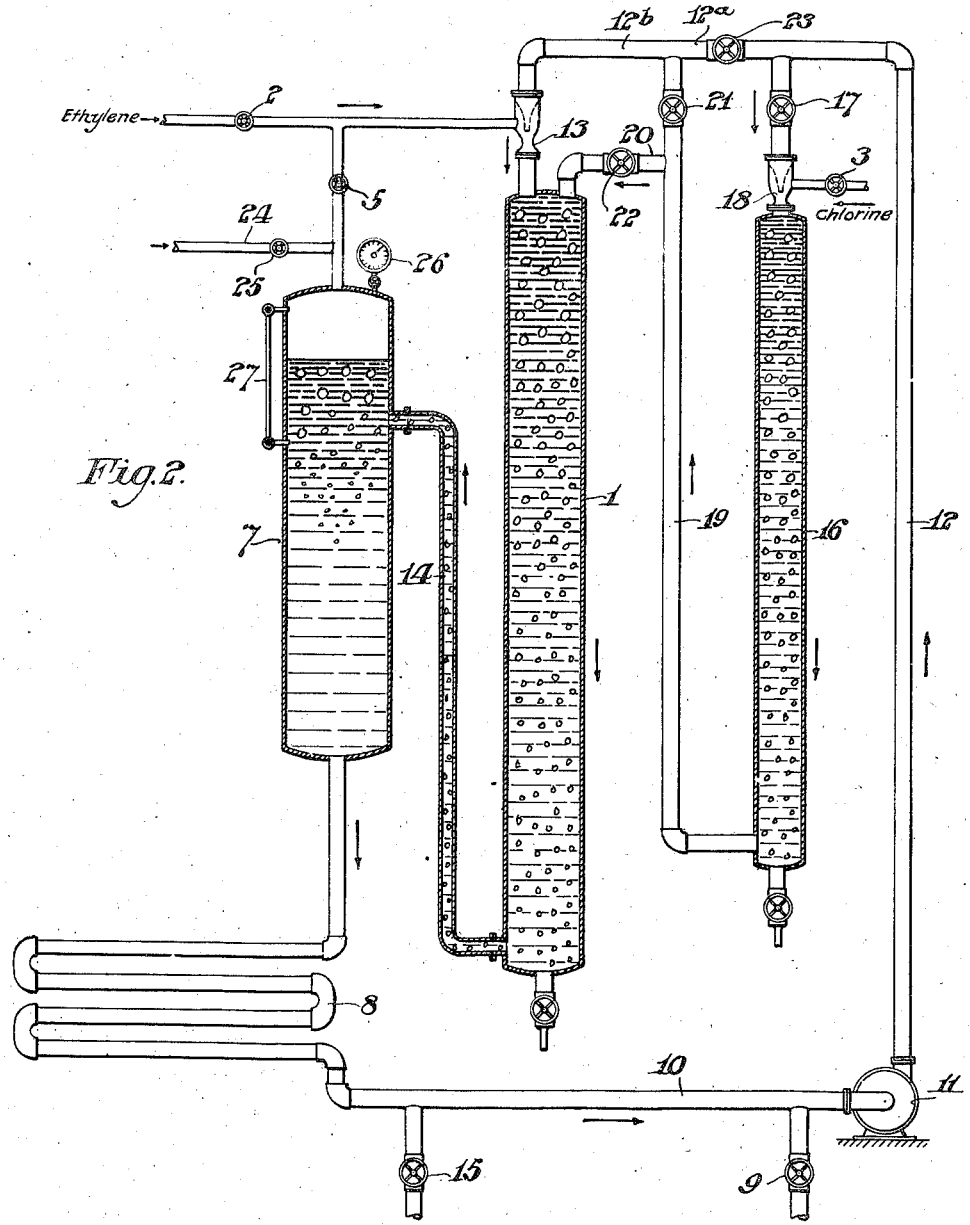

2,102,042

UNITED STATES PATENT OFFICE 2,102,042

PROCESS FOR MANUFACTURE OF CHLOR-HYDRINES

Le Roy U. Spence, Cheltenham, Pa., assignor to Röhm & Haas Company, Philadelphia, Pa.

Application January 23, 1936, Serial No. 60,445

11 Claims. (Cl. 260—157)

This invention relates to a process and apparatus for intimately associating a liquid solution with a finely dispersed insoluble or difficultly soluble gas for chemical reaction therewith. More particularly, the invention relates to a process and apparatus for the production of alkylene chlorhydrines from gaseous unsaturated hydrocarbons and chlorine in aqueous solution.

In chemical processes in which an insoluble gas is reacted with a component of a solution, it is essential that a large surface contact area be maintained between the gaseous phase and the liquid phase if the reaction is to proceed with any degree of rapidity. Heretofore, the customary method of obtaining the necessary degree of surface contact was to cause the liquid and gas to flow countercurrent in a suitable chamber over and through a packing having a large surface area. Another method was to vigorously agitate the liquid and gas in a large reaction vessel equipped with a powerful stirrer.

In the preparation of alkylene chlorhydrines by the reaction of hypochlorous acid and gaseous olefines, the common practice heretofore has been to prepare the hypochlorous acid either by the action of chlorine on aqueous solutions of alkalies or alkali carbonates, or suspensions of lime at low temperatures, or by dissolving chlorine in water. The use of alkalies and low temperatures is objectionable because of the increased cost incident to their use. The practical utilization of chlorine water involves considerable difficulties due to the presence of free chlorine that reacts with the olefine to form the alkylene dichloride.

The present invention has for its primary object the provision of a method and apparatus for the economical use of gaseous olefine, chlorine and water in the production of alkylene chlorhydrines. A further object is the development of a process and apparatus for the economical production of alkylene chlorhydrines wherein the production of alkylene dichlorides is reduced to a minimum. Another object of the invention is the development of a system for the continuous or intermittent production of alkylene chlorhydrines which provides for re-circulating the aqueous liquor and unreacted gases. A still further object is to produce an apparatus for intimately associating a gas and a liquid whereby a large surface contact area will be maintained between the two phases. These, and other objects will become apparent from the following description.

In the present invention these objects are attained by introducing into the upper portion of a vertical reaction zone gaseous olefines and chlorine in parallel flow with a circulating aqueous liquid and adjusting the flow of the liquid to carry the gas slowly down through the reaction zone. This may be accomplished by means of an aspirator or liquid jet pump or by forcing the gases under pressure directly into a rapidly moving stream of the circulating liquid. When an aspirator is used, it is preferably located at the upper end of a vertical tower with its ejection end directed downwardly into the body of the liquid. In this position it serves a triple purpose. It draws the gaseous olefine and chlorine into the system, disperses them in the form of very fine bubbles and by vigorously agitating the liquid in the upper portion of the tower maintains the gas in the form of a fine dispersion thus insuring intimate contact with the liquid. The aspirator may be omitted and the chlorine and olefine forced directly into the rapidly moving stream of the circulating liquid before it enters downwardly into the reaction tower. Due to the high velocity of the liquid the gases will be dispersed in the form of very fine bubbles before entering the tower. Furthermore, by flowing the liquid downward through the tower and adjusting its rate of flow, the tendency of the bubbles to rise and collect can be overcome and thus a larger quantity of liquid will come in contact with the highly dispersed gases. The rate at which the liquid passes through the tower is adjusted so that the bubbles move slowly down the tower and, if not absorbed, are carried out at the bottom thereof.

For a more complete description of the invention, reference will be made to the accompanying drawings in which like numerals indicate similar parts. In the drawings Fig. 1 is a vertical section of a preferred form of the apparatus in which chlorine and gaseous olefine are injected together into the reaction chamber. Fig. 2 is a vertical section of a similar apparatus in which a separate tower is provided for dissolving chlorine in the circulating liquid before it enters the reaction chamber. Fig. 3 is a cross section of the preferred form of aspirator used.

Referring to the drawings, the numeral (1) indicates a cylindrical reaction chamber or tower having at its upper end a downwardly pointed, liquid-operated aspirator (13). Numerals (2) and (3) indicate valves for controlling the rate and relative proportions of olefine and chlorine admitted to the apparatus. The valve (5) controls the recirculation of unreacted olefine that separates from the reaction liquor in a gas separator (7). A cooling coil (8) is provided to remove the heat generated by the reaction. A water inlet valve (9) may be provided in pipe line (10) for initially filling the apparatus with water and when the apparatus is operated as a continuous process, for supplying additional water to the system. A fluid pump (11) maintains a continuous circulation of fluid through the pipe line (12) to the aspirator (13), thence into and through the reaction tower (1), the draw-off line (14), the gas separator (7), the cooling coil (8) and back through pipe line (10) to the low pressure side of the pump. A draw-off valve (15) is provided to remove liquid from the system when it has become sufficiently concentrated with alkylene chlorhydrine. A gas vent (24) having a control valve (25) is provided to vent the gas separator when necessary. The gas separator should also be provided with a pressure gauge (26) and liquid level gauge (27) for determining the gas pressure and liquid level within the separator.

In the apparatus as illustrated in Fig. 2 an absorption tower (16) is provided for dissolving chlorine in the circulating liquid before it is introduced into the reaction chamber (1). Such absorption tower may be conveniently located as a by-pass in pipe line (12) whereby a portion of the circulating liquid is withdrawn from the pipe (12) through a valve (17) and aspirator (18) into and through the absorption tower (16) and thence through the pipe line (19) and, when valve (21) is closed, through pipe (20) and valve (22) into the upper portion of the reaction tower (1). A valve (23) is provided in section (12A) of pipe line (12) to cooperate with valve (17) to adjust the relative proportion of circulating liquid that passes through the absorption tower (16) to that which passes directly through the aspirator (13). Alternatively, by closing valves (22) and (23) and opening valves (17) and (21) all the circulating liquid can be passed through the absorption tower (16) pipe line (19) valve (21) section (12B) of pipe line (12) and thence through the aspirator (13) into the reaction chamber (1). The aspirator (18) is of a construction similar to that of aspirator (13) and is provided with a gas inlet valve (3) for drawing chlorine into the absorption tower.

The apparatus shown in Fig. 1 is preferred for the manufacture of ethylene chlorhydrine and can be used for the manufacture of the chlorhydrines of the higher olefines. However, the higher olefines react more readily with gaseous chlorine than does ethylene and their mixture with chlorine should be avoided as much as possible. For the production of chlorhydrines of the higher olefines, the apparatus of the type shown in Fig. 2 is preferred in which the chlorine is allowed to react with the water to form hypochlorous acid before coming into contact with the olefine.

In the production of ethylene chlorhydrine in the apparatus shown in Fig. 1 the operation is started by first filling the system with water through valve (9), air vent (24) being opened for this purpose. While the apparatus is being filled pump (11) is operated to insure the complete removal of air from all parts of the apparatus. After the air is removed, valve (9) is closed and valves (2) and (15) opened, whereby ethylene is drawn in and replaces a portion of the water withdrawn through valve (15). The pumping rate is adjusted so that the bubbles of ethylene formed by the aspirator (13) move slowly down the reaction tower (1) and into the gas separator (7). After the ethylene begins to collect in the gas separator, valves (2) and (3) are opened to admit equimolecular amounts of ethylene and chlorine, and valve (5) opened to permit the recirculation of the ethylene collected in the gas separator. The water passing through the aspirator (13) at high velocity draws in the ethylene and chlorine, disperses them in the reaction tower in a very fine state of subdivision and vigorously agitates the liquid in the upper portion thereof. The liquid as it travels down the tower in opposition to the tendency of the bubbles to rise, carries the gas in its highly dispersed state down with it, whereby the tower becomes substantially filled with small bubbles. A condition is thereby produced which is ideal for the solution of chlorine in water and the reaction between ethylene and the hypochlorous acid formed. The ethylene chlorhydrine thus produced, being soluble in water, circulates with water through the apparatus until its concentration reaches about 6% by weight, whereupon the solution is removed from the system through valve (15) and replaced with fresh water through valve (9).

While the use of an aspirator to draw the gaseous materials into the system is preferred it is not essential and may be replaced by suitable pumps that positively force the gaseous materials into the circulating liquid.

The temperature should be maintained at about 40° C. during the operation and it is desirable to have a slight excess of ethylene in the system. The pumping rate necessary to keep the bubbles from rising in the reaction tower is approximately 30 to 35 cubic feet per minute per square foot cross section of the reaction tower. Operating in this way a yield of ethylene chlorhydrine 94% of the theoretical can be obtained. This amounts to a 47% conversion of chlorine to ethylene chlorhydrine, 47% conversion to hydrochloric acid and 6% conversion to oils consisting chiefly of ethylene dichloride with some dichlorethylether. It is apparent that by the continuous addition of water through valve (9) and the removal of an equal amount of solution from valve (15) the operation may be carried on continuously. If desired however, the apparatus may be operated as a batch process by the complete removal of liquid when the concentration of ethylene chlorhydrine reaches approximately 6%. When operating as a continuous process, the addition of water should be adjusted so that the product removed through valve (15) will contain approximately 6% ethylene chlorhydrine by weight.

The apparatus as illustrated in Fig. 2 is operated in much the same way as has been described for Fig. 1, except that a portion or all of the circulating liquid is passed through an absorption tower (16) in which it absorbs chlorine and from there passes to the reaction tower (1). The action of the aspirators (13) and (18) in commingling the liquid and gas and agitating the two phases in the absorption and reaction tower is the same as that previously described for Fig. 1. A system of this nature is particularly suited for the production of ethylene chlorhydrine and the higher alkylene chlorhydrines.

In both types of apparatus the maximum yields of the chlorhydrine are obtained when solutions containing 4 to 6% by weight of chlorhydrine are are removed from the system. However, solutions of a concentration as high as 15 and 16% chlorhydrine may be prepared, but the yields will be slightly lower than when a 6% solution is removed. The yields obtained by a batch process are also slightly better than those obtained when the apparatus is operated continuously. For instance, an 8% solution of ethylene chlorhydrine was prepared by a batch operation with a yield of 91 to 92% of the theoretical, while a continuous process under the same conditions gave an 89 to 90% yield. The process may be operated over a considerable range of temperature (10° C. to 80° C.) but the range of 30–50° C. is preferred, and the best yields obtained at about 40°. The pumping rate necessary to disperse the bubbles in a 4–6% solution of chlorhydrine at temperatures of 30–40° C. was found to be approximately 30–35 cubic feet per minute per square foot of tower cross section. If a solution stronger than 6% or hotter than 40° C. is used, a higher pumping rate may be required to keep the gases highly dispersed and moving slowly down the tower.

The size of the gas separator must be such that the velocity of the liquid in it is low enough to permit the bubbles of gas to rise and separate from the liquid. A gas separator having two to three times the diameter of the reaction tower will meet these requirements. Obviously, any suitable device for separating the gas from the liquid may be used and where the process is carried out as a batch operation, the gas separator may be sufficiently large to act as a storage space for the batch. Alternatively, a separate tank could be used for this purpose.

If the ethylene or chlorine contains a small amount of inert gas, it will eventually collect in the gas separator with some ethylene and chlorine and may be periodically removed through the vent line (24). If a mixture of gases, such as the mixed hydrocarbons and olefines obtained in the cracking of petroleum, is used, the recirculation of the gases from the separator may be omitted, since the amount of inert gases in such mixtures is high.

It has been found that this process and apparatus can be used for the preparation of chlorhydrines of all the common unsaturated gaseous olefines, such as ethylene, propylene, butene-1, butene-2 isobutylene, etc. or mixtures of these. The chlorhydrines may be separated from the solution withdrawn by salting, distillation, extraction or other known means, or the solution may be used as it is obtained to prepare glycols or alkylene oxides.

This invention furnishes a practical and simple method of producing chlorhydrines. It avoids the trouble and expense of refrigeration and the use of alkalies, lime, soda ash, etc. The yields of alkylene chlorhydrine are good and the formation of alkylene dichloride very small. While I have described the preferred apparatus and mode of operation, it would be obvious to one skilled in the art that modifications may be made therein without departing from the scope thereof. It is also apparent that the apparatus described may be suitably modified and use in any chemical reaction between a liquid or solution and a relatively insoluble gas. It is to be understood that all matter contained in the above description is illustrative and that the invention is limited only by the scope of the following claims.

I claim:
1. In the manufacture of alkylene chlorhydrine from gaseous olefine, chlorine and water the steps of producing a large surface contact between liquid and gas by aspirating the chlorine and gaseous olefine into a body of water by means of a flowing stream of water, and flowing said body of water downwardly through a reaction chamber at a rate slightly in excess of that necessary to overcome the tendency of the gas bubbles to rise.

2. In the manufacture of alkylene chlorhydrine from gaseous olefine, chlorine and water the steps of aspirating the gaseous olefine and chlorine into a body of water by means of a flowing stream of water, flowing said body of water downwardly through a reaction chamber at a rate slightly in excess of that necessary to overcome the tendency of the bubbles to rise, and thereafter separating the unreacted gases from the aqueous liquor.

3. In the manufacture of alkylene chlorhydrine from gaseous olefine, chlorine and water the steps of aspirating the gaseous olefine and chlorine into a body of water by means of a flowing stream of water, flowing said body of water downwardly through a reaction chamber at a rate slightly in excess of that necessary to overcome the tendency of the bubbles to rise, and recirculating the aqueous liquor until the alkylene chlorhydrine content thereof reaches a concentration of between 1 and 16%.

4. In the manufacture of ethylene chlorhydrine from ethylene, chlorine and water the steps of producing a large surface contact between liquid and gas by aspirating a mixture of ethylene and chlorine into a body of water by means of a flowing stream of water, and flowing said body of water downwardly through a reaction chamber at a rate slightly in excess of that necessary to overcome the tendency of the gas bubbles to rise.

5. In the manufacture of ethylene chlorhydrine from ethylene, chlorine and water the steps of aspirating a mixture of ethylene and chlorine into a body of water by means of a flowing stream of water, flowing said body of water downwardly through a reaction chamber at a rate slightly in excess of that necessary to overcome the tendency of the bubbles to rise, and thereafter separating the unreacted gases from the aqueous liquor.

6. In the manufacture of ethylene chlorhydrine from ethylene, chlorine and water the steps of aspirating a mixture of ethylene and chlorine into a body of water by means of a flowing stream of water, flowing said body of water downwardly through a reaction chamber at a rate slightly in excess of that necessary to overcome the tendency of the bubbles to rise, and recirculating the aqueous liquor until the ethylene chlorhydrine content thereof reaches a concentration of between 1 and 16%.

7. In the manufacture of alkylene chlorhydrine from gaseous olefine, chlorine and water the steps of aspirating chlorine into a body of water by means of a flowing stream of water, flowing the water downwardly through a reaction chamber at a rate slightly in excess of that required to overcome the tendency of the chlorine bubbles to rise, flowing the solution thus formed through a second aspirator to aspirate olefine into said solution and flowing the solution downwardly through a second reaction chamber at a rate slightly in excess of that required to overcome the tendency of the olefine bubbles to rise.

8. In the manufacture of alkylene chlorhydrine from gaseous olefine, chlorine and water the steps of aspirating the gaseous olefine and chlorine into a body of water by means of a flowing stream of water, flowing said body of water downwardly through a reaction chamber at a rate slightly in excess of that necessary to overcome the tendency of the bubbles to rise, recirculating the aqueous liquor until the alkylene chlorhydrine content thereof reaches a concentration of between 1 and 16% and continuously removing said solution from and adding an approximately equal volume of water to the circulating liquid.

9. In the manufacture of alkylene chlorhydrine from gaseous olefine, chlorine and water the steps of introducing said gases into a rapidly moving stream of water and passing the water and gas in a downward direction through a reaction zone at such rate that the bubbles of the gas move slowly downwards.

10. In the manufacture of ethylene chlorhydrine from ethylene, chlorine and water the steps of introducing the ethylene and chlorine into a rapidly moving stream of water and passing the water and gas in a downward direction through a reaction zone at such rate that the bubbles of the gas move slowly downwards.

11. In the manufacture of ethylene chlorhydrine from ethylene, chlorine and water the steps of aspirating chlorine into a body of water by means of a flowing stream of water, flowing the water downwardly through a reaction chamber at a rate slightly in excess of that required to overcome the tendency of the chlorine bubbles to rise, flowing the solution thus formed through a second aspirator to aspirate the ethylene into said solution and flowing the solution downwardly through a second reaction chamber at a rate slightly in excess of that required to overcome the tendency of the ethylene bubbles to rise.

LE ROY U. SPENCE.